United States Patent Office 3,396,387
Patented Aug. 6, 1968

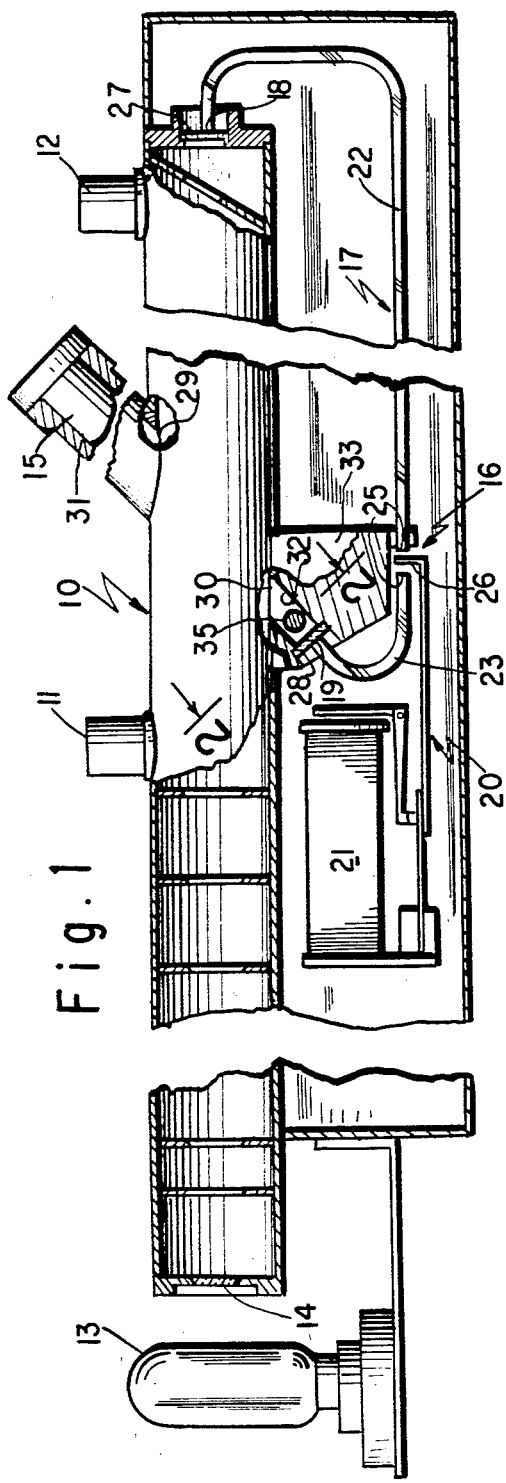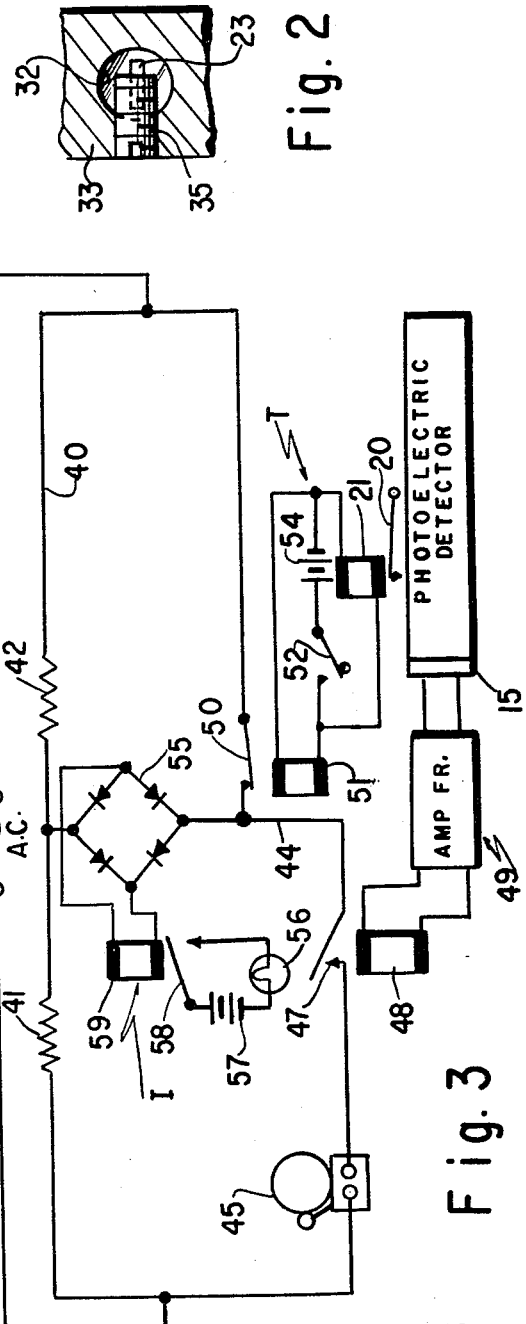

3,396,387
SUPERVISED APPARATUS FOR DETECTING
SUSPENDED MATTER IN FLUIDS
Harry C. Grant, Jr., Ridgewood, N.J., assignor, by mesne assignments, to Walter Kidde & Company, Inc., Belleville, N.J., a corporation of New York
Original application July 24, 1962, Ser. No. 212,097, now Patent No. 3,240,109, dated Mar. 15, 1966. Divided and this application Sept. 23, 1965, Ser. No. 489,554
2 Claims. (Cl. 340—410)

ABSTRACT OF THE DISCLOSURE

The present invention relates to apparatus of the light responsive type for detecting and indicating the presence of suspended matter in fluids, and, more particularly, to a test network and an indicating network for supervising the integrity of such apparatus.

This application is a division of application Serial No. 212,097, filed July 24, 1962, now Patent No. 3,240,109, dated March 15, 1966.

The improvements in accordance with the present invention are particularly adapted to be embodied in smoke detectors which generally comprise a casing having an inlet and an outlet for circulating air samples therethrough which are withdrawn from one or more spaces where the presence of smoke is to be detected, an electric lamp and lens for directing a beam of light through the air samples, a photoelectric cell located to receive light rays affected by smoke particles suspended in the air samples and to produce a signal in response to light rays so affected, and indicating means responsive to the signal of the cell.

Accordingly, an object of the present invention is to provide an arrangement for performing a test which causes every element of the alarm system, except the actual signal, to operate exactly as it should in the presence of a given minimum density of smoke and if inoperative in any respect to cause operation of a distinctive fault signal.

A further object is to provide such an arrangement which lends itself for connection in a network for rendering alarm means ineffective while testing the signal of the photoelectric cell.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein:

FIG. 1 is a fragmentary longitudinal sectional view of detecting apparatus in accordance with the present invention.

FIG. 2 is an enlarged sectional view taken along the line 2—2 on FIG. 1.

FIG. 3 is a simplified wiring diagram of a network utilized in connection with the detecting apparatus for supervising the integrity thereof.

Referring now to FIG. 1 of the drawing in detail, there is shown apparatus for detecting suspended matter in fluids which generally comprises a casing 10 having an inlet 11 and an outlet 12 for circulating a stream of fluid therethrough such as air in which suspended matter such as smoke is to be detected, a light source such as an incandescent lamp 13 and a lens system 14 at one end of the casing for directing a beam of light through the stream of fluid along the longitudinal axis of the casing 10, a photoelectric element or cell 15 located to receive light rays reflected from suspended matter in the fluid stream and constructed and arranged to produce a signal in response to such light rays, an arrangement 16 for causing the photoelectric cell 15 to give a signal comparable to the signal produced by the aforementioned reflected light rays, and means in an electrical network (FIG. 2) controlled by the simulated signal of the cell for supervising the integrity of the apparatus.

The cell may be of any type including, for example, the photovoltaic type which has an output to produce a signal or the resistive type which upon change in resistance due to change in light produces a signal. It is contemplated that such cells may be used with or without amplification of the signal, depending on the strength of the signal and the characteristics of the component to be actuated by it.

The arrangement 16 in its preferred form generally comprises elongated light conveying means 17 having one end 18 located for receiving light from the beam of light and having its other end 19 located for directing light conveyed therethrough onto the photoelectric cell 15, and means such as a shutter 20 positioned with respect to the light conveying means 17 for normally preventing light from passing through the means 17 or being directed onto the photoelectric cell, and a solenoid 21 for moving the shutter to render it ineffective whereby light passes through the means 17 and is directed onto the cell to cause it to produce the simulated signal.

The light conveying means 17 preferably includes two sections 22 and 23 each having an end 25 facing the other and being spaced apart a distance to allow a shutter portion 26 to enter and be withdrawn from this space, whereby light can be conveyed from one end 25 to the other when the shutter portion is withdrawn. The sections 22 and 23 may have any desired cross-sectional shape but preferably are rectangular strips to enable a shutter to be used which has a short stroke. These sections are formed of a clear highly efficient light conveying plastic resin or equivalent material.

The strip 22 at the end 18 is secured to face a window 27 at the end of the casing opposite the lamp 13 and the strip 23 at the end 19 is secured to face a window 28 in axial alignment with and opposite the photoelectric cell 15. Preferably, the casing 10 has diagonally disposed opposite openings 29 and 30 between its inlet and outlet which the cell 15 and the window 28 face respectively, with the cell being mounted in a tube 31 positioned in the opening 29 and the window 28 being mounted in the bore 32 of a block 33 positioned over the opening 30. The block 33 also serves as a means for mounting the ends 25 of the strips to maintain them in alignment with each other.

In order to adjust the light conveying means 17 to direct the same amount of light onto the photoelectric cell as the cell sees when light is reflected thereon by a calibrated density of suspended particles in the stream of fluid, means are provided for partially blocking the conveyed light. As shown in FIG. 2, such means may comprise a screw member 35 threaded into the block 33 and extending crosswise in the bore 32 between the window 28 and the opening 30 in a direction to overlie the strip 23 at 19 widthwise so that by moving the screw member in and out of the block more or less of the end of the strip is covered by the screw member to thereby vary the light directing effectiveness of the strip 23.

Alternatively, the light conveying means may be a system of mirrors for directing light onto the cell 15, and the function of the shutter may be accomplished by moving at least one of the mirrors so that light normally is prevented from being conveyed and arranging the mirrors with respect to each other to convey light to the cell for producing a simulated output.

In FIG. 3, a network in accordance with the present invention is shown which tests by actuating all the components of an alarm system except the alarm device per se, and which checks the networks of the system following the test to assure that the alarm device is restored in the system. This network system generally comprises an alarm network A, a test network T, and an indicating network I.

The alarm network comprises a line 40 having voltage dividing resistors 41 and 42 connected in series, and a line 44 connected in parallel with the line 40 across an AC source. The line 44 has connected therein, in series from left to right as viewed, an alarm device such as a gong 45, a normally open switch 47 of a relay 48 controlled by the photoelectric cell signal through an amplifier 49, and a normally closed switch 50 of a relay 51 in the test network.

The test network includes a single pole throw switch 52 and a source of electrical energy 54 connected to the shutter solenoid 21 and the relay 51 in a manner to normally de-energize the solenoid 21 and maintain the shutter in light blocking position as shown in FIG. 1 and to normally de-energize the relay 51 and maintain the switch 50 in closed position.

The indicating network comprises a full wave rectifier 55 having its AC input connected across the lines 40 and 44 between the resistors 41 and 42 and between the switches 47 and 50, respectively; and an indicator such as a lamp 56, a source of electrical energy 57 and a normally open switch 58 of a D.C. relay 59 connected in series, with the relay 59 connected across the D.C. output of the rectifier 55 to hold the switch 58 open while current is passing through the coil of this relay. Preferably, the relay 59 is of the slow release type for the purpose about to be described, and the resistors 41 and 42 balance the network system so that the current passing through the D.C. relay coil has a fixed value while the network system is in proper working order.

During the normal operation of the apparatus, the switch 47 is open and switch 50 is closed so that current alternates through the resistor 41, the rectifier 55 and the switch 50 to maintain the relay 59 energized and its switch 58 open as shown in FIG. 3. In the event this circuit is not in proper working order due to accidental opening of the switch 50, broken conductors or failure of the resistor 41, the relay 59 is de-energized and the switch 58 will close to indicate trouble. While the switches are in the aforementioned positions, should smoke be detected by the photoelectric detector, the signal of the cell 15 through the amplifier 49 energizes the relay 48 to close the switch 47 whereby the gong 45 is connected across the AC source and is actuated to give an alarm.

In order to test the integrity of the photoelectric detector, the switch 52 is operated to energize the relay 51, whereby the switch 50 is opened, and to energize the solenoid 21, whereby the shutter is rendered ineffective and light directed onto the cell 15 produces a signal which through the amplifier 49 energizes the relay 48 to close the switch 47. As this occurs, the gong 45 will not be actuated because the switch 50 is open and the current alternating through the resistor 42, the rectifier 55 and the gong is of a value insufficient to actuate the gong, but the relay 59 will remain energized to hold its switch 58 open. In the event this circuit is not in proper working order due to failure of the switch 47 to close, broken conductors or failure of the resistor 42, the solenoid 21 or the relay 48, the relay 59 is de-energized and the switch 58 will close to indicate trouble. Should the relay 51 fail to open the switch 50, the gong 45 will give a false alarm to indicate trouble.

During the testing of the apparatus in the foregoing manner, if the cell 15 fails to produce a signal, or the amplifier 49 fails to respond or the relay 48 fails to close the switch 47, both switches 47 and 50 are now open, and the rectifier 55 has no AC input to produce a DC output whereby the relay 59 is de-energized and allows the switch 58 to close and effect illumination of the lamp 56 to give a trouble indication.

When the switch 52 is opened, the relay 51 is de-energized to allow the switch 50 to close and the relay 21 is de-energized to place the shutter 20 in light blocking position, whereby the cell signal ceases and the relay 48 drops out to open the switch 47 and the network system is restored to its normal operating condition.

Since the relay 59 is of the slow release type, it will not allow the switch 58 to close for an interval of time, for example about 0.5 second, so that no trouble signal is indicated while both the switches 47 and 50 are open during switch-over in beginning and ending the test.

The lamp 56 will also indicate AC power failure or failure of the rectifier 55, the relay 59, or failure of resistors 41 and 42, the coil of the gong 45 or connecting wiring.

From the foregoing description, it will be seen that the present invention provides improved apparatus for detecting suspended matter in fluids which is supervised in a simple, practical and reliable manner to test the integrity thereof by checking the functioning of every component except the mechanical functioning of gong 45 but including power failure, decrease in light from the source 13, deterioration of the cell, mechanical operation of the solenoid 21 and the relays 48, 51 and 59, broken connections, failure of the resistor 41 and 42, and the physical and electrical closure of the switch contacts. The gong 45 however may be tested by a simple circuit for connecting it directly across the A.C. source.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In apparatus for detecting suspended matter in fluids, the combination of an alarm network including an alarm, a source of AC for operating said alarm, a normally open first switch and a normally closed second switch connected in series with said first switch to effect operation of said alarm upon closing of said first switch; a casing having an inlet and an outlet for circulating a stream of fluid therethrough; a light source for directing a beam of light through the stream of fluid in said casing; a photoelectric element located to receive light rays affected by suspended matter in the fluid stream and constructed and arranged to produce a signal in response to light rays so affected; a test network including a source of energy, test means for affecting said photoelectric element to produce a signal comparable to the signal produced by the aforementioned affected light rays, means for opening said second switch and actuating said test means, and a test switch for effecting operation of said last mentioned means; means controlled by the signal of said photoelectric element for closing said first switch; and an indicating network including a source of energy, an indicator and a switch connected for operating said indicator, a relay for normally maintaining said last mentioned switch open, a full wave rectifier having its AC input connected across said AC source and between said first and second switches and having its DC output connected to said relay.

2. In apparatus for detecting suspended matter in fluids, the combination of an alarm network including first and second lines connected in parallel across a source of AC, said first line having a pair of resistors connected in series therein and said second line having an alarm, a normally open first switch and a normally closed second switch connected in series therein; a casing having an inlet and an outlet for circulating a stream of fluid therethrough; a light source for directing a beam of light through a stream of fluid in said casing; a photoelectric element located to receive light rays affected by suspended matter in the fluid stream and constructed and arranged to produce a signal in response to light rays so affected; a test network including a source of energy, test means for affecting said photoelectric element to produce a signal comparable to the signal produced by the aforementioned affected light rays, relay means for opening said second switch, solenoid means for actuating said test means, and a test switch for effecting operation of said relay and solenoid means; relay means controlled by the signal of said photoelectric element for closing said first switch; and an indicating network including a source of energy, an indicator and a switch connected for operating said indicator, a slow release relay for normally maintaining said last mentioned switch open, and a full wave rectifier having its AC input connected across said lines between said pair of resistors and between said first and second switches and having its DC output connected to said relay.

References Cited
UNITED STATES PATENTS 2,877,453    3/1959    Mendenhall    340—237

JOHN W. CALDWELL, *Primary Examiner.*

D. K. MYER, *Assistant Examiner.*